Aug. 30, 1927.

G. K. SPITZENBERG 1,640,811

GRUBBER OR CULTIVATOR

Filed Feb. 24, 1925

2 Sheets-Sheet 1

Inventor:
Georg Karl Spitzenberg
by
Lorka, Kehlenbeck & Farley
Attys

Inventor:
Georg Karl Spitzenberg
by Lotka, Kehlenbeck & Farley
Attys

Patented Aug. 30, 1927.

1,640,811

UNITED STATES PATENT OFFICE.

GEORG KARL SPITZENBERG, OF ZACKERICK, GERMANY.

GRUBBER OR CULTIVATOR.

Application filed February 24, 1925, Serial No. 10,998, and in Germany February 29, 1924.

My invention relates to improvements in grubbers or cultivators to be used in forestry, agriculture and horticulture, and more particularly in the construction of the blades of the grubber or cultivator. The object of the improvements is to provide a cultivator by means of which the soil is made loose, pulverized and mixed, and in which the lower portions are slightly compressed, while a layer of loose soil is spread on the surface of the land. I have found that by thus preparing the soil and providing a slightly compressed bottom layer the moisture is held within the loose soil, and that the loose soil spread on the surface prevents evaporation. Further the holes made in the land by the blades and loosely filled with soil insure aeration of the soil. With these objects in view my invention consists in the construction of the grubber blades described hereinafter and particularly pointed out in the appended claims.

Figure 1:
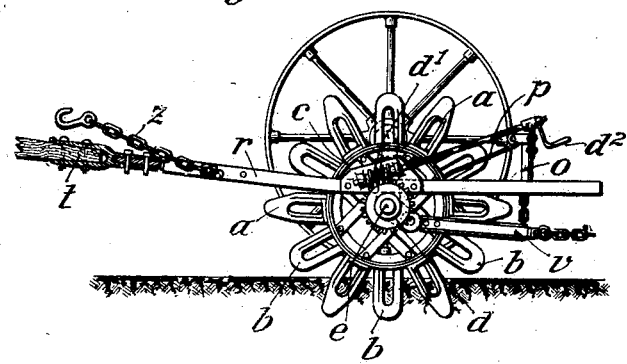
Figure 3:
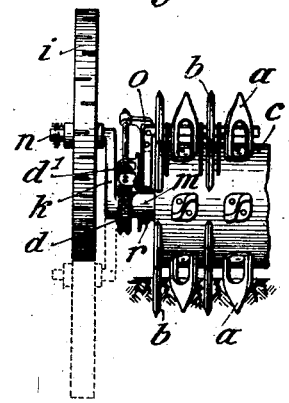
Figure 2:
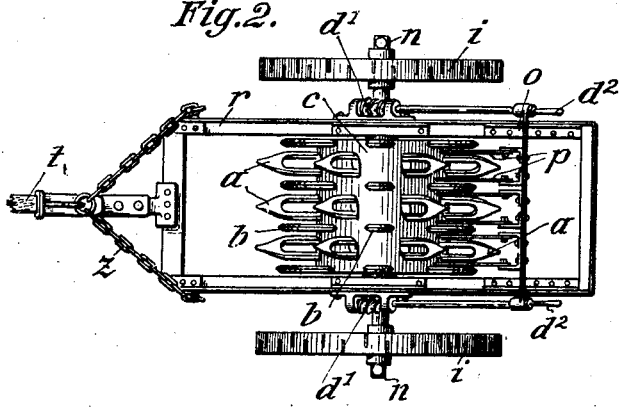
Figure 10:
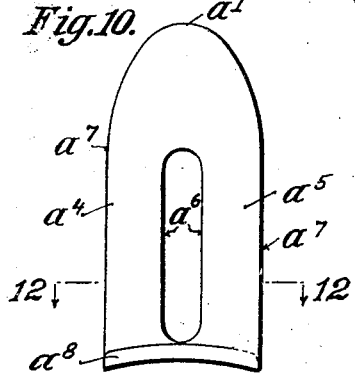
Figure 8:
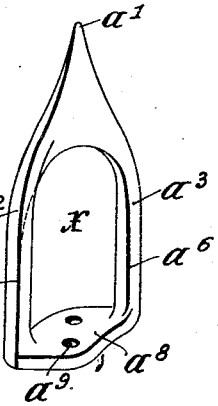
Figure 9:
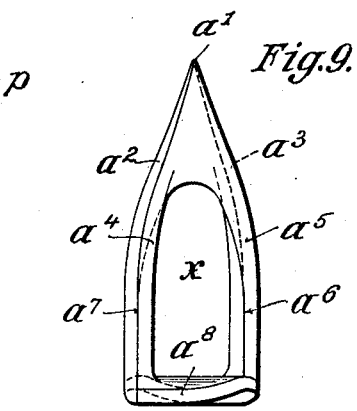
Figure 11:
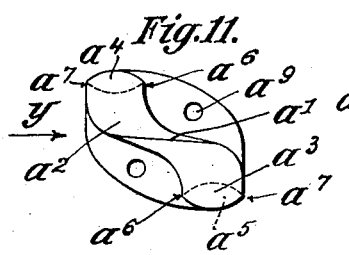
Figure 12:
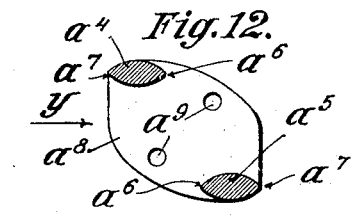

For the purpose of explaining the invention several examples embodying the same have been shown in the accompanying drawings in which the same reference characters have been used in all the views to indicate corresponding parts. In said drawings, Fig. 1, is an elevation of the cultivator, Fig. 2, is a top plan view thereof, Fig. 3, is a partial end view of Fig. 1, Fig. 4, is an elevation showing a modification, Fig. 5, is a top-plan view of Fig. 4, Figs. 6 and 7, are respectively an end view and an elevation showing a modification of the cultivator, Fig. 8, is a perspective view showing the blade, Fig. 9, is an elevation of the blade looking in the direction of the movement thereof, Fig. 10, is an end view looking from the right in Fig. 9, Fig. 11, is a top plan view of the blade, and Fig. 12, is a section on the line 12—12 of Fig. 10.

In order that my invention be clearly understood I shall at first describe various types of cultivators or grubbers provided with my improved blades. In the example shown in Figs. 1 to 3, the cultivator consists of a wheeled frame $r$ having a pole $t$ and chains $z$ attached thereto or provided with means for attaching the same to mechanical traction means. On the said frame a drum $c$ is rotatable which is provided with a plurality of circumferential series of main blades $a$ and subsidiary blades $b$, the series of main and subsidiary blades $a$ and $b$ being alternately arranged on the drum. The axle $e$ of the drum is rotatably mounted at its ends in sleeves $m$ made integral with cranks $k$ having the wheels $i$ mounted on their pins $n$. To the sleeves $m$ worm gears $d$ are keyed which are in mesh with worms $d^1$ adapted to be rotated by means of hand cranks $d^2$ mounted on brackets of the frame $r$. By turning the sleeves $m$ and the cranks $k$ the position of the wheels $i$ relatively to the drum $c$ may be varied for varying the depth to which the soil is grubbed or for raising the drum and its blades off the ground when driving on roads.

Figure 4:
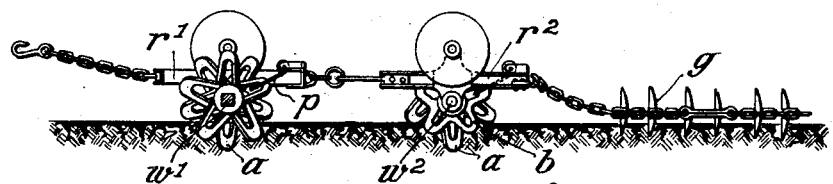
Figure 5:
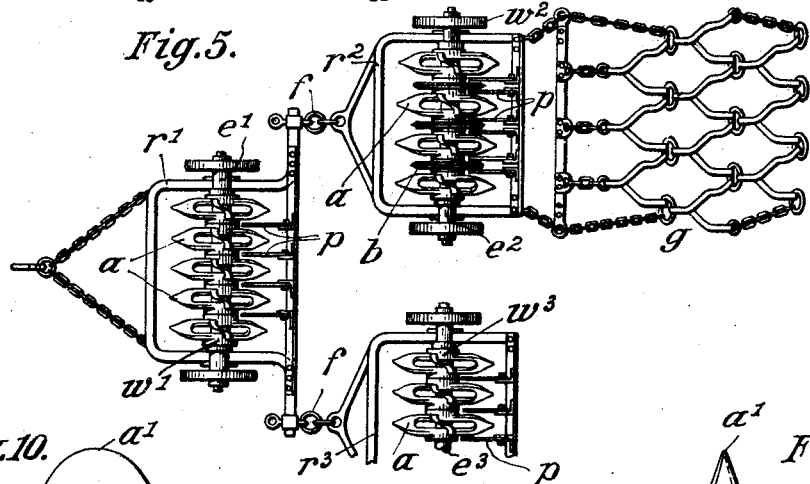

In the modifications shown in Figs. 4 and 5 the cultivator consists of three sectional cultivators each comprising a frame $r^1$, $r^2$, $r^3$, respectively, and rotary grubber members $w^1$, $w^2$, $w^3$, respectively, two of the said sectional cultivators $r^2$ and $r^3$ being attached by chain links $f$ or the like to opposite sides of the member $r^1$. The cultivator members $w^1$, $w^2$, $w^3$ consists of individual sleeves rotatably mounted on the shafts $e^1$, $e^2$, $e^3$ and having the blades $a$ made integral therewith.

Figure 6:
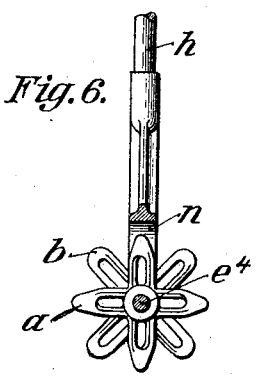
Figure 7:
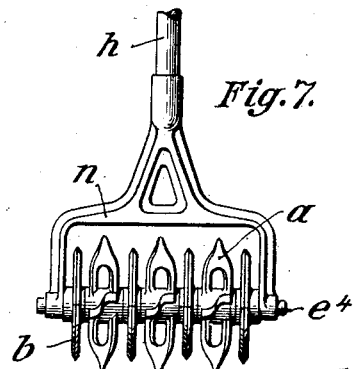

In Figs. 6 and 7 I have shown a cultivator adapted to be dragged by hand and comprising a yoke in having a pole $h$ secured thereto. The arms of the yoke $n$ are connected by an axle $e^4$ having series of main and subsidiary blades $a$ and $b$ rotatably mounted thereon, the construction of the main blades $a$ being similar to that of the blades described with reference to Figs. 4 and 5.

The construction of the main blades $a$ has been shown in detail in Figs. 8 to 12. The blade $a$ consists of an outer flat portion $a^1$ reduced in width from its inner end towards its outer end and having a sharp edge $a^2$—$a^1$—$a^3$ located substantially in the direction of the rotary movement of the blade, which direction has been indicated in Figs. 11 and 12 by an arrow Y. At its sides the said portion is curved laterally in opposite directions so as to provide a body similar in form to a helicoid, and the said sides are made integral each with a shank $a^4$ and $a^5$ of oblong section and formed at its front and rear with edges $a^6$ and $a^7$. At their bottom ends the said shanks are connected by a foot plate $a^8$ provided with two bores $a^9$ for the passage of bolts therethrough, said bolts being used for securing the blade to the drum $c$ shown in Figs. 1 to 3. If the blades are provided on sleeves in the manner described with reference to Figs. 4 to 7, the foot plate $a^8$ is omitted. It will be seen that the two shanks $a^4$, $a^5$ being located laterally of each other, rotate in different paths, and moreover, one of these shanks is in advance of the other.

When the blade is passed into the ground the edges $a^2$—$a^1$—$a^3$ and $a^6$, $a^6$ cut through the grass and the like. By reason of the curved form of the blade the loosened soil is slightly compressed at its bottom part, so that it is adapted to hold the water therein.

In the operation of the cultivator the drum $c$ or other blade carrier is rotated so that the blades engage the soil at first only with their points, whereupon they are gradually pressed into the same. When the blades are thus forced into the soil parts of the latter fall into the open portions of the blades, thus reducing the resistance of the blades within the soil and the power required for moving the cultivator. The blades produce comparatively deep holes in the soil and when retracted therefrom they carry along the portions of the soil gathered within their open parts $x$, which portions are spread on the surface of the land and cover the holes made by the blades. Therefore the moisture is held within the loose layer of the soil, and further the air has access to the said soil through the holes made therein by the blades and loosely filled and covered with the loose soil raised by the open portions $x$.

In some cases I provide a harrow $g$ at the rear of the cultivator for further pulverizing the loose surface of the land and leveling the same. It will be understood that the said harrow is not used for example when preparing the soil in winter time, when it is desired to have an irregular surface exposed to the action of the frost.

Preferably the cultivator is provided with elastic clearing members $p$ adapted to remove weeds, moss or grass from the blades.

In some cases where the traction power is sufficient I attach other implements, such as grubbers, harrows and the like, to the cultivator, for which purpose the frame is provided with a traction yoke $v$.

While in describing the invention reference has been made to a particular example embodying the same I wish it to be understood that my invention is not limited to the construction of the blade shown in the drawings and that various changes may be made in the form of the blade without departing from the invention.

I claim:

1. A rotary grubbing member provided with grubbing blades each of which has two shanks connected at their outer ends by an outwardly tapering flat portion and spaced at their body portions, the body portions of said two shanks being located laterally of each other so that they will rotate in different paths.

2. A rotary grubbing member provided with grubbing blades each of which has two shanks connected at their outer ends by an outwardly tapering flat portion and spaced at their body portions, the body portions of said two shanks being located laterally of each other so that they will rotate in different paths, and one of such body portions being located in advance of the other.

3. A rotary grubbing member provided with grubbing blades each of which has two shanks connected at their outer ends by an outwardly tapering flat portion and spaced at their body portions, each of said shanks having operative edges both at the front and at the rear of its body portion.

4. A rotary grubbing member provided with grubbing blades, each blade being formed at its outer part with an edge running substantially in the direction of the movement of the blade and with helical shanks beginning from the said outer part and curved therefrom in lateral direction and having their inner ends placed one behind the other in the direction of the movement of the blade, and said shanks being provided with edges located substantially in the direction of the movement of the blade.

5. A rotary grubbing member provided with main grubbing blades, each blade being formed at its outer part with an edge running substantially in the direction of the movement of the blade and with helical shanks beginning from the said outer part and curved therefrom in lateral direction and having their inner ends placed one behind the other in the direction of the movement of the blade, and said shanks being provided with edges located substantially in the direction of the movement of the blade, and subsidiary blades disposed circumferentially of said rotary grubber member and laterally of said main blades.

6. A rotary grubbing member provided with grubbing blades each of which has two shanks connected at their outer ends by an outwardly tapering flat portion and spaced at their body portions, each of said shanks having an operative edge at the rear of its body portion.

7. A rotary grubbing member provided with grubbing blades each of which has two shanks connected at their outer ends by an outwardly tapering flat portion and spaced at their body portions, each of said shanks having an operative edge at the front of its body portion.

8. A rotary grubbing member provided with grubbing blades each of which has two shanks connected at their outer ends by an outwardly tapering flat portion and spaced at their body portions.

In testimony whereof, I hereunto affix my signature.

GEORG KARL SPITZENBERG.